Jan. 30, 1968     M. J. DE LEONARDIS     3,366,095
CONTROL SYSTEM AND WARP SWITCH
Filed Oct. 22, 1965     2 Sheets-Sheet 1
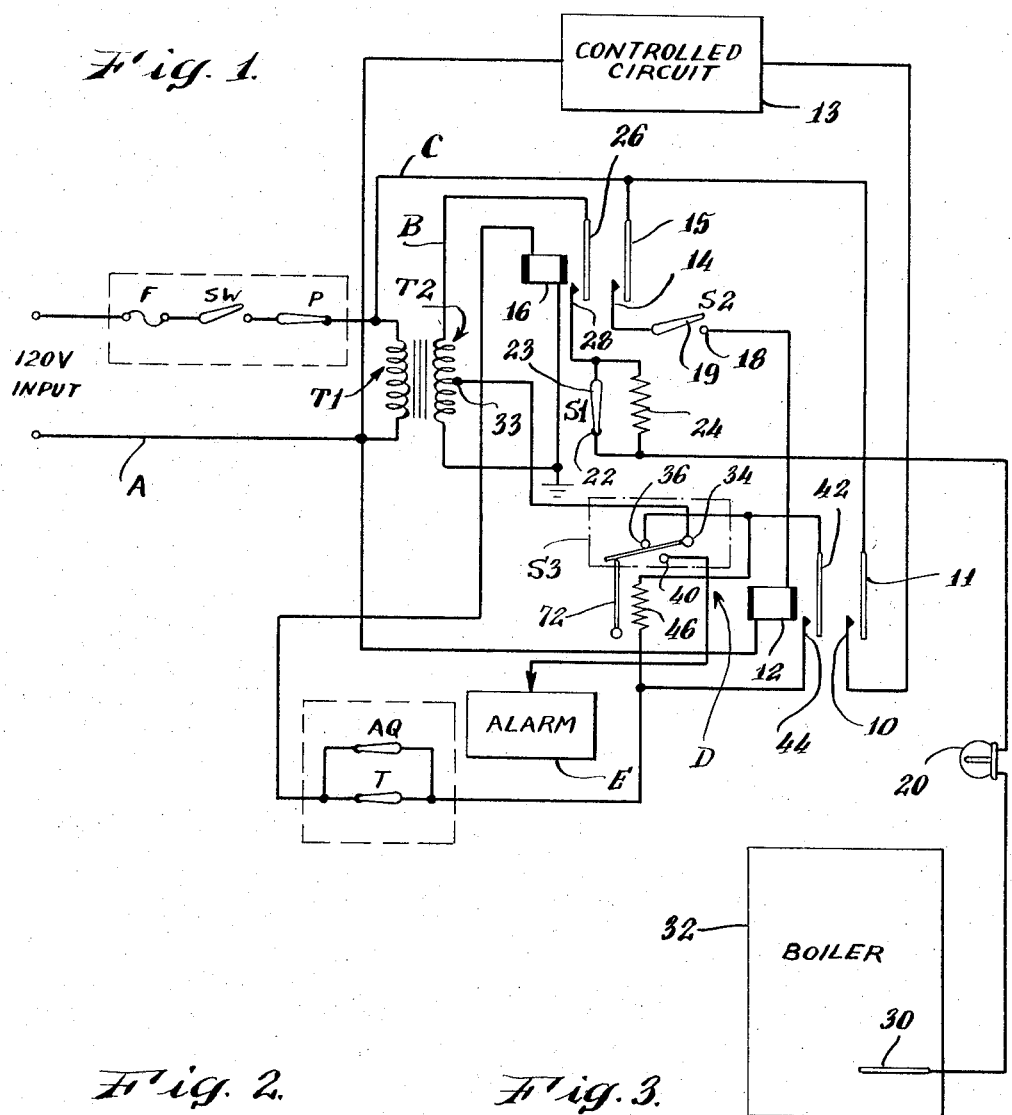
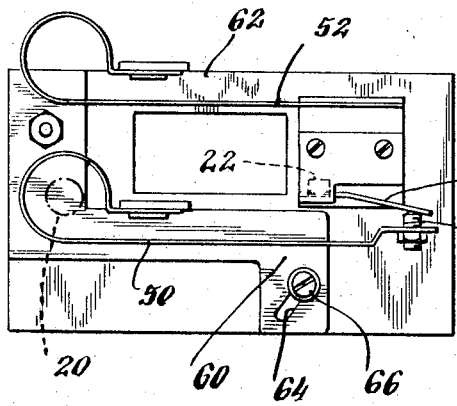
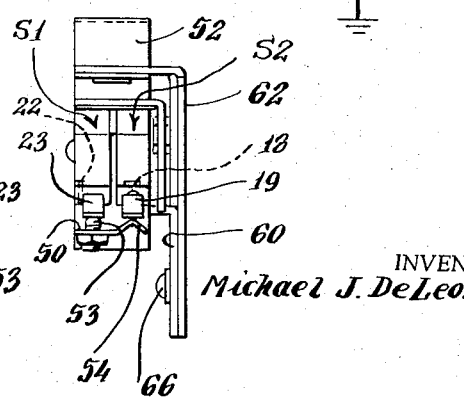
INVENTOR.
Michael J. DeLeonardis

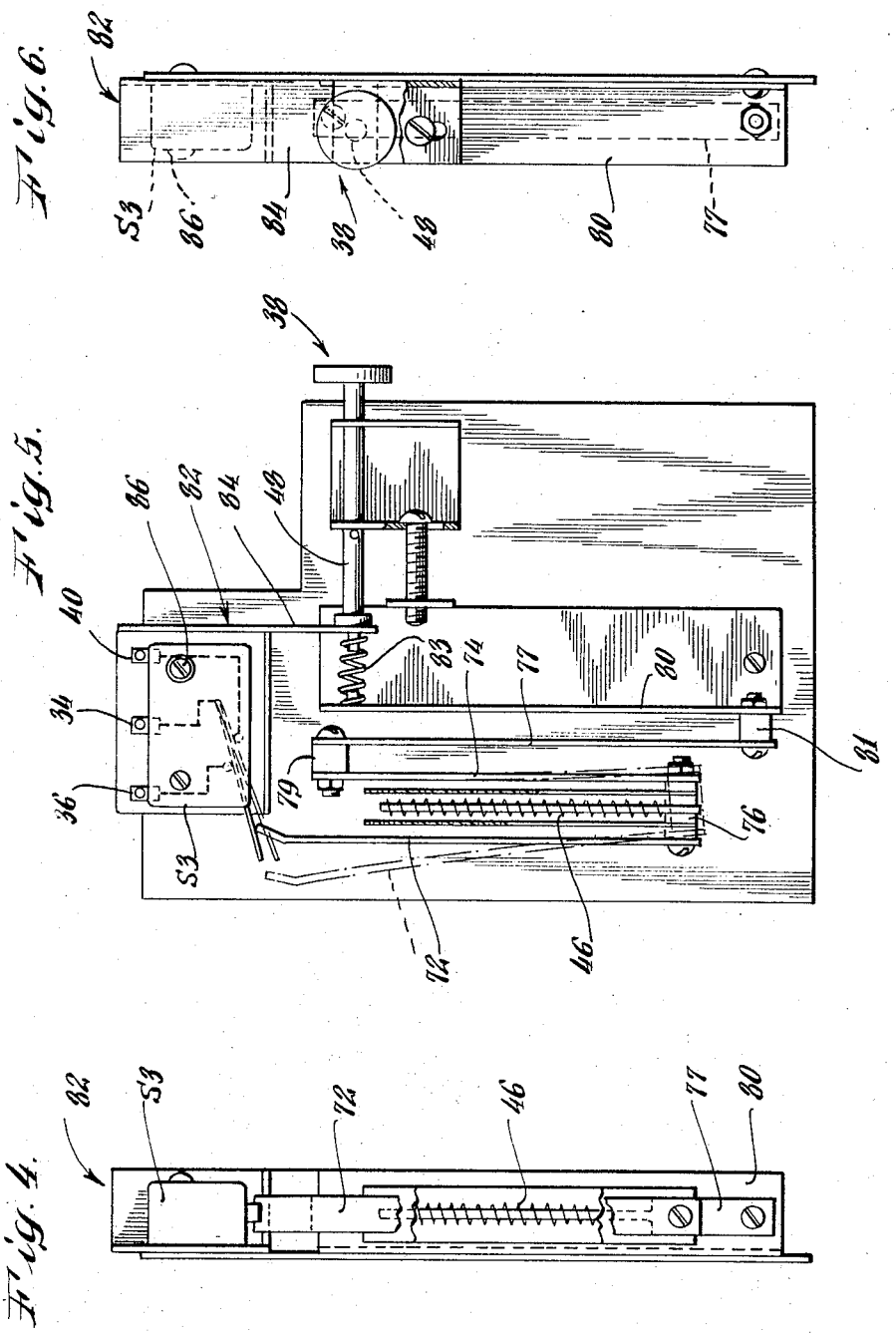

United States Patent Office 3,366,095
Patented Jan. 30, 1968

3,366,095
CONTROL SYSTEM AND WARP SWITCH
Michael J. De Leonardis, 164 E. Lincoln Ave.,
Valley Stream, N.Y. 11580
Filed Oct. 22, 1965, Ser. No. 501,558
15 Claims. (Cl. 122—504)

ABSTRACT OF THE DISCLOSURE

A safety control system for actuating and deactuating a control circuit such for example as a burner circuit associated with a boiler. It comprises first and second electrical circuits and supply means for said circuits. The first electrical circuit includes a heat source, any initially closed switch, thermostat and aquastat means and a switch responsive thereto. The second electrical circuit includes an initially open switch and means operative when the initially open switch is closed to actuate the controlled circuit. In addition there is provided heat sensitive means operative when both the switches of the first circuit are closed to close the initially open switch of the second circuit, and, after a time interval open the initially closed switch of the first circuit.

---

This invention relates to an electrical control system, including a warp switch, for actuating and deactuating a controlled electrical circuit, such for example as a burner circuit associated with a boiler.

The warp switch disclosed and claimed herein is a modification and improvement of the warp switch which is the subject of U.S. Patent 3,017,477, issued to me Jan. 16, 1962.

An object of the invention is to provide improved control means, including an improved warp switch for controlling a controlled circuit.

Another object of the invention is to provide a control system having a high safety factor.

Another object of the invention is to provide a fail safe system which will not function unless properly wired.

Another object of the invention is to provide an effective warp switch including a bimetal arm without employing the arm as an electrical conductor.

Another object of the invention is to provide a system which will remain operative in spite of poor operating practices and spotty maintenance.

A further object of the invention is to provide a simple and effective system, employing a simple and effective warp switch, which is simple in structure, and easy to maintain, and which is dependable in operation without reliance and dependence upon the human factor.

The invention will best be understood by reading the following description in connection with the accompanying drawings in which:

FIGURE 1 is a schematic view of a circuit described herein,

FIGURE 2 is a side elevation of a warp switch by which the lamp and operating circuits shown in FIGURE 1 are controlled, FIGURE 3 is an end elevation of the warp switch as shown in FIGURE 2, FIGURE 4 is a left hand view of the structure shown in FIGURE 5, FIGURE 5 is a side elevation of means for controlling the reset and alarm circuits, and FIGURE 6 is a right hand view of the structure shown in FIGURE 5.

The control comprising the invention is described herein as applied to a boiler, to shut off the burner and give warning if the water in the boiler falls below an electrode positioned in the boiler.

As shown therein an input circuit A, having a source of power, which may be a house power supply comprising 120 volts, leads to the primary T–1 of an input transformer. Within this circuit a conventional fuse F, on-off switch SW, and "pressure-trol" P are provided.

The input circuit A is connected directly to a second or operating circuit C, comprising the pair of contacts 10 and 11 controlled by relay coil 12. When circuit C is closed it actuates a controlled circuit 13, which for the purpose of this description may be considered to be a circuit controlling a burner (not shown) associated with a boiler 32. Included in circuit C is a pair of contacts 14 and 15 controlled by relay coil 16, and a switch S–2, which may be a miniature or micro switch having a contact 18 and a movable contact arm 19. Contact 18 of switch S–2 is connected to relay coil 12.

The secondary T–2 of the transformer is connected at one end to a first, or lamp heating circuit B, and a part of secondary T–2 is connected in a third or reset circuit D.

The first or heating circuit B comprises a lamp 20, a normally closed switch S–1 which may be a miniature or micro switch, and is in parallel with resistance 24. Switch S–1 comprises a contact 22 and movable arm contact 23. Circuit B also includes a contact 28 and a movable contact arm 26 controlled by relay coil 16, and an electrode 30 disposed within the boiler 32. Relay 16 is energized when either the thermostat T or the aquastat AQ calls for heat and contacts 26 and 28 close, and at the same time contacts 14 and 15 in circuit C are closed.

It will be understood that the controlled burner circuit 13 will be needed only if either the thermostat T or the aquastat AQ is calling for heat and the water level in the boiler is above electrode 30; that when either T or AQ is closed relay coil 16 is energized and contacts 26 and 28 are closed, and lamp 20 is lighted and starts radiating heat to heat responsive arm 50. Arm 50 heats and starts to bend or is otherwise distorted and first closes switch S–2 and then opens switch S–1, shunting the current through resistance 24 thus reducing the current to the lamp 20 from 120 v. to 60 v. This permits bimetal arm 50 to cool and unbend until switch S–1 is closed again. Thus the range of bending of arm 50 is limited and if the water level falls too low it will not require more than one and one half minutes for arm 50 to unbend enough to open switch S–2 and thus deenergize the controlled burner circuit 13. Opening switch S–2 also deenergizes relay coil 12 causing contacts 44, 42 to separate (and also contacts 10, 11) and this shunts the current through heating coil 46 which distorts heat responsive means shown in FIGURES 4, 5 and 6 and opens the reset circuit D and closes the alarm circuit E. The control system cannot again become operative until the reset switch is closed manually, which, alone or with the alarm circuit should be enough to prevent an operator from permitting water to be supplied into the boiler while it is overheated.

It will be noted that no current passes through either arm 50 or arm 52.

The third circuit D has a tap 33 leading from an intermediate point on T–2, to provide 24 volts, for example, instead of the house voltage of say 120 v., to a movable contact arm 34 which is common to both the reset and alarm circuits and is movable between contact 36 of the reset circuit and contact 40 of the alarm circuit. Contact 36 is connected both to contact 42 of the pair of contacts 42, 44 controlled by relay 12, and to the heating coil 46 which is in parallel with the pair of contacts 42, 44. When the circuit is operating safely contact arm 34 will be held against contact 36 by heat distortable means, and, as illustrated herein, specifically by the free end of bimetal strip 72. If relay 12 is deenergized, as it is when circuit B is opened, and contacts 42, 44 are separated, current is shunted through heating coil 46, and the heat from coil 46 actuates the heat distortable means, shown herein as comprising strips 72, 74 and 77, which cause the free end of strip 72 to bend and move beyond the free end of arm 34 which then drops onto contact 40 of the alarm circuit. The free end of strip 72 is inclined so that it overlies the free end of arm 34 after the bending of arm 72 has allowed arm 34 to drop, and thus arm 34 is locked in contact with contact 40 of the alarm circuit until it is manually freed by pushing the reset button 38.

As shown in FIGURES 4, 5 and 6 the heating coil 46 is disposed between two bimetal strips 72 and 74 which are spaced apart and interconnected by a cross pin 76. Both of these arms respond to heat from coil 46 and cause movement of the free end of arm 72 relatively to the double switch arm 34. Arms 74 and 72 are connected at one end, as by pin 76. Strip 74 is connected at its opposite end by pin 79 to a third bimetal strip 77 which serves in this sub-assembly to compensate for changes in ambient temperature. The opposite end of bimetal arm 77 is connected by pin 81 to the support bracket 80.

The free end of strip 72 is disposed adjacent the movable contact arm 34 and normally holds it against contact 36. As bimetal strip 72 is heated and bends it moves away from arm 34 which, when no longer supported by strip 72, falls onto contact 40. To provide a positive action insuring arm 34 will be held on contact 40 until reset button 38 is pushed, the free end of strip 72 is inclined to overlie arm 34 after strip 72 has moved past the free arm of 34, and locks it against contact 40. In order to disengage arm 34 from the overlying end of strip 72, the contact arm 34, as well as contacts 36 and 40, are supported on a swivelled mounting 82 and the stem 48 of reset button 38 abuts against an arm 84 extending from mounting 82. When button 38 is pushed in, the mounting 82 swivels on pivot 86, against the force of spring 83, thus freeing arm 34 from strip 72, and, strip 72, having cooled and unbent, moves back to a position of readiness, in abutting relation to arm 34 when the swivelled mounting 82 returns to its normal, at rest position when button 38 is released.

Bimetal strip 74 is disposed so that it bends oppositely to strip 72 thus adding to the swinging movement of the free end of strip 72 relative to arm 34.

The combination of contacts 36 and 40 and the movable contact 34 are identified in the drawings as S-3.

With the reset switch 38 closed, as it normally is, and with the lamp or other heat source 20 radiating heat at either of two levels, bimetal arm 50 of the warp switch operates, after a predetermined interval, to close switch S-2, energizing relay coil 12 and closing contacts 10, 11 of the second or operating circuit C, which in turn actuates the controlled circuit 13. Relay coil 12 closes contacts 42, 44 of the reset circuit D at the same time.

If the water level in boiler 32 falls below the electrode 30, switch S-2 is opened, after a short interval, due to unbending of the warp switch strip 50, relay coil 12 is deenergized, and the contacts 42, 44 (and also contacts 10, 11) are opened, coil 46 is heated and after a predetermined interval actuates the heat responsive means described above and causes movable contact arm 34 to move from contact 36 to contact 40 thus opening the reset circuit and closing the alarm circuit switch.

The warp switch means illustrated in FIGURES 2 and 3, for controlling switches S-1 and S-2 of the lamp heating, and the operating circuits respectively, comprise bimetal strips 50 and 52. Strip 50 is shown disposed with one end encircling lamp 20. The other end of strip 50 is positioned adjacent to first and second micro switches S-1 and S-2, which are shown supported on one end of the second bimetal strip 52, which is preferably exactly similar to the first bimetal strip 50 so that they will both be equally affected by ambient temperature, but with only the first bimetal strip positioned to be responsive to the heat from lamp 20. The first bimetal strip 50 carries two separate abutment members 53 and 54, and is adapted when heated, to bend against and move switch arms 19 and 23 of the second and first micro switches respectively, which are supported from strip 52, to lift switch arm 19 into contact with contact 18 comprising part of the second micro switch S-2, and, after an interval, to lift arm 23 of switch S-1 from contact 22, thereby shunting the circuit through resistance 24. Either or both of contacts 53 and 54 may be adjustable toward and away from their respective micro switch arms.

Strip 50 is mounted on bracket 60 and the strip 52 is mounted on plate 62. Bracket 60 is adjustably mounted on plate 62, as by the inclined slot means 64 and headed pin 66, so that the strip 50 may be adjusted in position toward and away from strip 52 and the micro switches carried by strip 52.

The time intervals, between energizing the heat source, closing contacts 18, 19, opening contacts 22, 23 and reclosing contacts 22, 23, and for actuating the reset switch to open after contacts 42, 44 have opened, can be arranged as desired. I have had good results with a system in which an interval of one-half minute is required after the heat source is energized, for the arm 50 to bend sufficiently to close the operating circuit C by closing contacts 18, 19, the contacts 22, 23 of switch S-1 are not opened for fifteen seconds after contacts 18, 19 close, and contacts 22, 23 of S-1 may remain open indefinitely as long as the lamp is being heated through the resistance 24, but usually arm 50 unbends enough with reduced heating from lamp 20 to again close contacts 22, 23 in from two to five minutes; and two minutes is required for opening of the reset switch after contacts 42, 44 are separated and heating coil 46 is energized.

There has thus been provided an apparatus by which the objects of the invention are achieved in a thoroughly practical manner.

What I claim is:

1. A safety control system for actuating and deactuating a controlled circuit, comprising, first and second electrical circuits and power supply means for said circuits, said first electrical circuit including a heat source, an initially closed switch, thermostat and aquastat means and a switch in said first circuit responsive thereto, said second electrical circuit including an initially open switch, means operative when said initially open switch of said second circuit is closed to actuate said controlled circuit, and heat sensitive means operative when both the switches of said first circuit are closed to close the initially open switch of said second circuit and, after a time interval, open the initially closed switch of the first circuit.

2. The system claimed in claim 1 in which the second normally closed switch of the first circuit is disposed in parallel with a resistance through which the current is shunted when said switch is opened, thus maintaining the circuit closed although operating alternately at different voltages.

3. The system claimed in claim 1 in which the means operative to close the initially open switch of the second circuit is a warp switch, not electrically included in either said first or second circuits, comprising, a first heat responsive arm disposed adjacent said heat source, and a second arm, serving as a support for the initially open switch of said second circuit, and disposed in operative relation to the first arm so that a predetermined distortion of said first arm in response to heat from said heat source will close the initially open switch of the second circuit.

4. The system claimed in claim 1 in which the means operative to close the initially open switch of the second circuit, and to open the normally closed switch of the first circuit, comprises, support means for the initially open switch of the second circuit, and for the normally closed switch of the first circuit, and heat responsive means for opening and closing said switches respectively, disposed in operative relation to said heat source and the said switches.

5. The system claimed in claim 1 in which the initially closed switch of the first circuit is disposed in parallel with means for establishing in said first circuit a different voltage to dim said heat source and movements of said first heat responsive arm cause alternating heating and partially cooling of said heat source.

6. The system claimed in claim 1 in which the controlled circuit is a burner circuit for a boiler, the first circuit includes an electrode disposed in the boiler and is completed through water to the grounded wall of the boiler when the water level in the boiler is not below the electrode, and when the water level in the boiler falls below the electrode the heat source is deenergized and the consequent movement of the heat sensitive means causes reopening of the initially open switch of the second circuit and deactuation of said controlled circuit.

7. The system claimed in claim 1 including a reset switch circuit comprising a reset switch, a pair of contacts in parallel with a heating coil, means for opening said pair of contacts a predetermined time interval after opening of the first circuit, thereby shunting the current through said heating coil, and means operative in response to heating of said heating coil to open said reset switch.

8. The system claimed in claim 1 including reset switch and alarm circuits having a movable contact arm in common which is adapted to be moved alternatively against a contact in the reset switch circuit or against a contact in the alarm circuit, means normally holding the movable contact arm closed against the contact of the reset switch circuit, and means operable by opening of the first circuit to cause said movable arm to move from the contact of the reset switch circuit against the said contact of the alarm circuit.

9. The system claimed in claim 1 including a reset switch circuit, an alarm circuit, and a movable contact arm adapted alternatively to close against a contact in said arm adapted alternatively to close against a contact in said reset switch circuit or against a contact in said alarm circuit, a heat responsive member normally holding the movable contact arm against the contact of the reset switch, and a heating coil disposed in parallel with one pair of contacts which are opened when the first circuit is opened, thereby shunting power through said heating coil, whereby heating of the heating coil moves said heat responsive means thereby causing said movable arm to open the reset circuit and close the alarm circuit.

10. The system claimed in claim 1 including a reset switch circuit, an alarm circuit, and a movable contact arm adapted alternatively to close against a contact in said reset switch circuit or against a contact in said alarm circuit, a heat responsive member normally holding the movable contact arm against the contact of the reset switch, and a heating coil disposed in parallel with one pair of contacts which are opened when the first circuit is opened, thereby shunting power through said heating coil, (whereby heating the heating coil moves said heat responsive means thereby causing said movable arm to open the reset circuit and close the alarm circuit), the said heat responsive member being disposed so that its upper end normally holds the movable arm in closed position against the said contact of the reset circuit and when heated bends away from the free end of said movable arm, allowing the free arm to move from the contact of the reset circuit to the contact of the alarm circuit the free end of said heat sensitive strip being inclined toward the movable contact arm so that, after said strip has bent sufficiently to free the movable arm, its inclined free end will overlie the movable arm and prevent it from being moved off the contact of the alarm circuit until the reset switch is closed manually.

11. The system claimed in claim 1 including an alarm circuit having a normally open switch, and means operative a predetermined interval after opening of the first circuit to close said switch.

12. A warp switch assembly comprising, support means for a plurality of switches connected in separate circuits, heat responsive means not included in either of said circuits and disposed in operative relation to said switches respectively and adapted when sufficiently heated after a heating interval to move and cause opening and closing of said switches.

13. The warp switch claimed in claim 12 in which said supported switches each comprise a fixed contact and a movable contact, and the heating of the heat responsive means causes the movable contact of the first of said switches to move off its related fixed contact, and causes the movable contact of the second of said switches to move onto its related fixed contact.

14. The warp switch claimed in claim 12 in which said first switch comprises a movable contact arm and a fixed contact, disposed in parallel with a resistance, and heating of the heat responsive means, after an interval of time, causes the said movable contact of said first switch to be moved off its related fixed contact whereby the circuit is shunted through said resistance.

15. The warp switch claimed in claim 12 in which the first of said switches comprises, a pair of normally closed contacts adapted to pass a current of one voltage, disposed in parallel with means for passing a current of another voltage, and heat distortable means disposed so that when distorted a predetermined amount it opens said pair of contacts.

References Cited

UNITED STATES PATENTS

| | | |
|---|---|---|
| 2,384,372 | 9/1945 | Eaton. |
| 2,773,488 | 12/1956 | MacCracken et al. __ 122—504 X |
| 2,887,152 | 5/1959 | Wilder. |
| 3,017,471 | 1/1962 | De Leondardis. |

CHARLES J. MYHRE, *Primary Examiner.*

UNITED STATES PATENT OFFICE
CERTIFICATE OF CORRECTION

Patent No. 3,366,095                        January 30, 1968

Michael J. De Leonardis

It is hereby certified that error appears in the above numbered patent requiring correction and that the said Letters Patent should read as corrected below.

Column 1, line 5, for "any" read -- an --; column 5, lines 41 and 42, after "contact" strike out "in said arm adapted alternatively to close against a contact"; column 6, lines 3 and 5, strike out the parenthesis, each occurrence; lines 12 and 13, after "circuit" insert a comma.

Signed and sealed this 1st day of April 1969.

(SEAL)
Attest:

Edward M. Fletcher, Jr.                        EDWARD J. BRENNER
Attesting Officer                                    Commissioner of Patents